(12) United States Patent
Kwon et al.

(10) Patent No.: US 7,607,805 B2
(45) Date of Patent: Oct. 27, 2009

(54) BACKLIGHT ASSEMBLY AND LIQUID CRYSTAL DISPLAY THEREOF

(75) Inventors: Yoon-Soo Kwon, Gyeonggi-do (KR); Jung-Tae Kang, Gyeonggi-do (KR); Sang-Hoon Park, Gyeonggi-do (KR); Jin-Ho Ha, Gyeonggi-do (KR); Yong-Seok Yang, Chungcheongnam-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 124 days.

(21) Appl. No.: 11/651,873

(22) Filed: Jan. 9, 2007

(65) Prior Publication Data

US 2007/0230169 A1    Oct. 4, 2007

(30) Foreign Application Priority Data

Apr. 3, 2006    (KR) .................. 10-2006-0030180

(51) Int. Cl.
*F21V 15/02*    (2006.01)
(52) U.S. Cl. .................. 362/378; 362/217.14; 362/632
(58) Field of Classification Search ................ 362/217, 362/378, 632, 217.08, 217.14, 217.16, 217.17
See application file for complete search history.

(56) References Cited

U.S. PATENT DOCUMENTS 5,720,625 A    2/1998    Albeck et al.

2006/0279957 A1    12/2006    Kwon et al.

FOREIGN PATENT DOCUMENTS

| EP | 1753088 | 2/2007 |
|---|---|---|
| GB | 2324420 | 10/1998 |
| JP | 2005-158585 | 6/2005 |

OTHER PUBLICATIONS

English Language Abstract, JP Patent First Publication No. 2005-158585, Jun. 16, 2005, 1 page.
European Search Report, Nov. 7, 2007, corresponding to European Patent Application No. 07010138.1.

*Primary Examiner*—Sandra L O'Shea
*Assistant Examiner*—Meghan K Dunwiddie
(74) *Attorney, Agent, or Firm*—Innovation Counsel LLP

(57) ABSTRACT

A lamp holder includes a holder body and a power connector. A lamp guide groove is formed on an upper portion of the holder body. An inverter insertion groove is formed on a lower portion of the holder body, and a power supply board is slidably coupled to the inverter insertion groove. The power connector includes a first portion exposed to the inverter insertion groove, and a second portion disposed adjacent to the lamp guide groove. The lamp holder fixed to a fixing groove of an insulation plate is inserted into an opening formed through a bottom plate of a receiving container. Thus, a backlight assembly having the lamp holder may be easily assembled and repaired.

18 Claims, 19 Drawing Sheets

BACKLIGHT ASSEMBLY AND LIQUID CRYSTAL DISPLAY THEREOF

CROSS-REFERENCE TO RELATED APPLICATIONS

This application relies for priority upon Korean Patent Application No. 2006-30180 filed on Apr. 3, 2006, the contents of which are herein incorporated by reference in their entireties.

FIELD OF THE INVENTION

The present invention relates to a back light assembly for a liquid crystal display having a lamp holder and a power supply module.

DESCRIPTION OF THE RELATED INVENTION

Generally, a backlight assembly employed in a liquid crystal display (LCD) device may be classified into either a direct illumination type backlight assembly or an edge illumination type backlight assembly according to the position of the light source. The direct illumination type backlight assembly having a plurality of cold cathode fluorescent lamps typically includes lamp holders to hold the lamps to a bottom plate of a receiving container. When the conventional backlight assembly is assembled, the lamp holders and wires connected to an inverter are soldered, or a plurality of terminals of the lamp holders is soldered to a printed circuit board. This procedure takes much time and the lamps are frequently damaged during the soldering process. Also, when a defective inverter is replaced with a new inverter, the lamps must first be separated from the lamp holders, whereby making repair inefficient.

SUMMARY OF THE INVENTION

In one aspect of the present invention, a lamp holder includes a holder body and a power connector. A lamp guide groove is formed on an upper portion of the holder body and an inverter insertion groove is formed on a lower portion of the holder body. The power connector includes a first portion exposed to the inverter insertion groove, and a second portion disposed adjacent to the lamp guide groove.

In an exemplary embodiment, the power connector is disposed at a first recess of the lamp holder, the lamp guide groove is disposed and extended to a first direction opposite to the first recess, and the inverter insertion groove is disposed and extended to a second direction opposite to the first recess. The inverter insertion groove may be recessed to a predetermined depth to expose the first portion of the power connector. The first portion of the power connector may be bent from the first recess to the second direction of the inverter insertion groove at a lower portion of the first portion. The first portion of the power connector may include an inverter catching structure having, for example, a hook shape.

The second portion may include a wire catching portion located near the lamp guide groove and holding a wire of the lamp which is located at the outer end of the lamp. The lamp holder may further include a holder cap inserted to the first recess in a third direction from the lamp guide groove to the inverter insertion groove. The first portion of the power connector may include a power input portion receiving a power source externally provided, and the second portion of the power connector may include a power output portion applying the power source to an electrode portion of the lamp.

In another aspect of the present invention, a power supply manifold includes a power supply board and a plurality of lamp holders. A plurality of power output terminals is formed along an edge portion of the power supply board. Each of the lamp holders includes a holder body and a power connector. A lamp guide groove is formed on an upper portion of the holder body and an inverter insertion groove is formed on a lower portion of the holder body. The edge portion of the power supply board is inserted into the inverter insertion groove. The power connector includes a first portion and a second portion. The first portion is exposed to the inverter insertion groove and makes contact with the power output terminal. The second portion is disposed adjacent to the lamp guide groove.

In an exemplary embodiment, the power supply manifold further includes an insulation plate facing the power supply board and having a fixing groove into which the holder body is inserted. The first portion may include a first connection portion and a second connection portion. The first connection portion makes contact with an upper surface of the power supply board. The second connection portion makes contact with a lower surface of the power supply board. The power output terminal may be formed on one of the upper surface and the lower surface of the power supply board to make contact with one of the first connection portion and the second connection portion.

In still another aspect of the present invention, a backlight assembly includes a plurality of lamp holders, a receiving container, a plurality of lamps and a power supply board. The receiving container includes a bottom plate and a sidewall. The bottom plate has a plurality of openings into which the lamp holders are inserted. The sidewall is disposed on a peripheral portion of the bottom plate. Each of the lamps includes a lamp tube and an electrode portion. The lamp tube is guided by the lamp guide groove, and the electrode portion extends from an end portion of the lamp tube and makes contact with the second portion. The power supply board is slidably inserted into the inverter insertion groove exposed to a rear surface of the bottom plate. Power output terminals are formed on the power supply board, and makes contact with the first portion.

In an exemplary embodiment, the backlight assembly further includes an insulation plate. The insulation plate is disposed between the bottom plate and the power supply board. A fixing groove, into which the holder body of each of the lamp holders is inserted, is formed on the insulation plate. The backlight assembly may further include a side mold and an optical unit. The side mold covers the lamp holders. The optical unit is disposed over the lamps.

In an exemplary embodiment, the backlight assembly further includes a lamp reflector and a light guiding plate. The lamp reflector is disposed adjacent to the sidewall to enclose the lamp and reflect light generated from the lamp toward a receiving space defined by the bottom plate and the sidewall. The light guiding plate includes a light-exiting face, a counter face facing the light-exiting face, and a side face connecting the light-exiting face and the counter face. The lamp is disposed adjacent to the side face.

In still another aspect of the present invention, a display device includes a plurality of lamp holders, an insulation plate, a receiving container, a plurality of lamps, a power supply board, an optical unit and a display panel. The insulation plate has a fixing groove into which the holder body of each of the lamp holders is slidably inserted. The receiving container includes a bottom plate having a plurality of openings into which the lamp holders fastened to the insulation plate are inserted, and a sidewall disposed on a peripheral portion of the bottom plate. Each of the lamps includes a lamp tube guided by the lamp guide groove, and an electrode portion extending from an end portion of the lamp tube and making contact with the second portion. The power supply board is slidably inserted into the inverter insertion groove exposed to a rear surface of the bottom plate. Power output terminals that make contact with the first portion are formed on the power supply board. The optical unit is disposed over the lamps, and the display panel is disposed over the optical unit.

According to the above, soldering between the lamp and the lamp holder and soldering between the lamp holder and the power supply board are omitted to thereby improve assemblability of the backlight assembly and the display device, and the power supply board may be easily reworked.

BRIEF DESCRIPTION OF THE DRAWING

The foregoing and other objects, features and advantages of the present invention will become more apparent from a reading of the ensuing description together with the drawings, in which.

DESCRIPTION OF THE EMBODIMENTS

Lamp Holder

Figure 1:
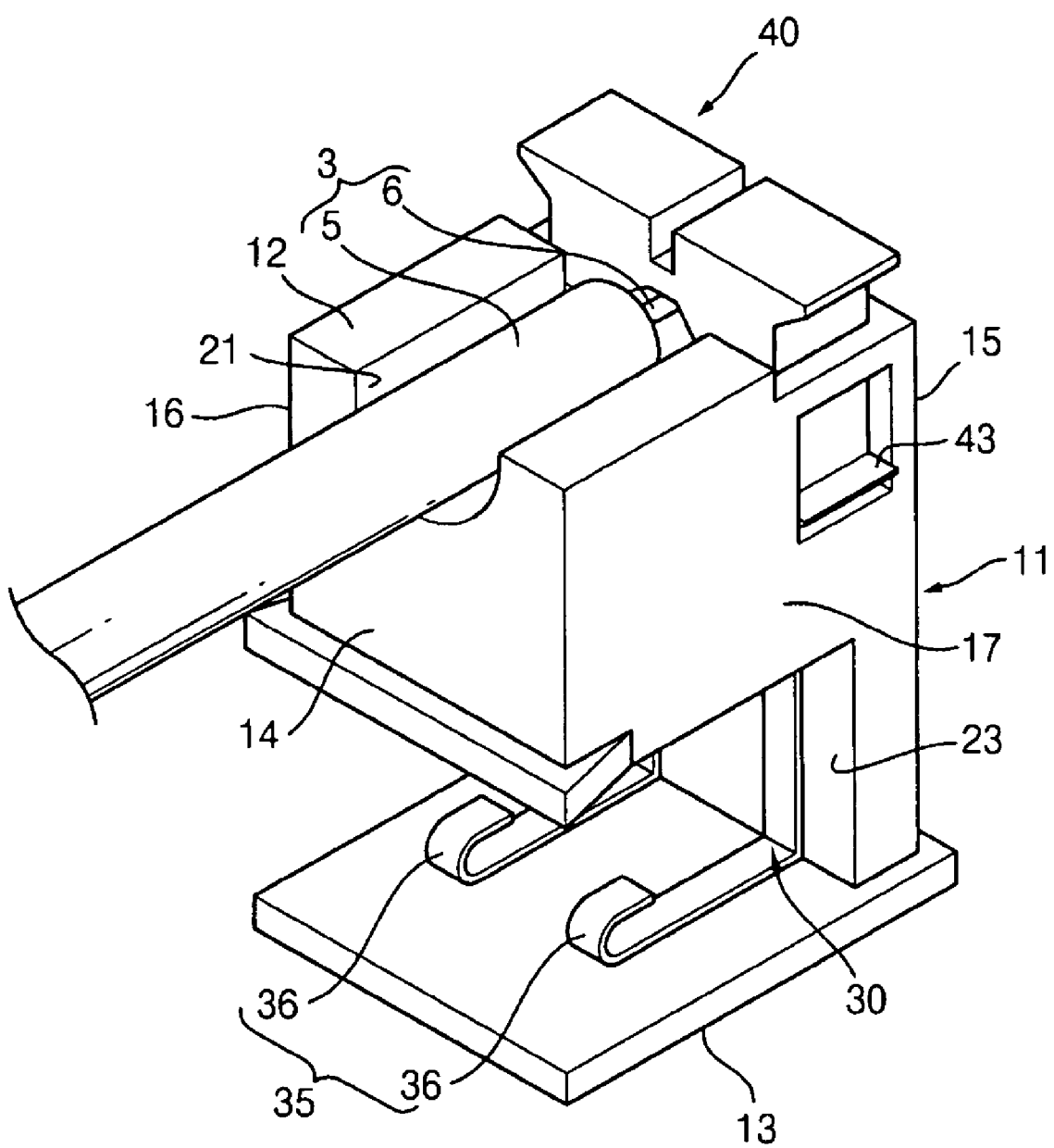
FIG. 1 is a perspective view illustrating a lamp holder according to an exemplary embodiment of the present invention.
Figure 2:
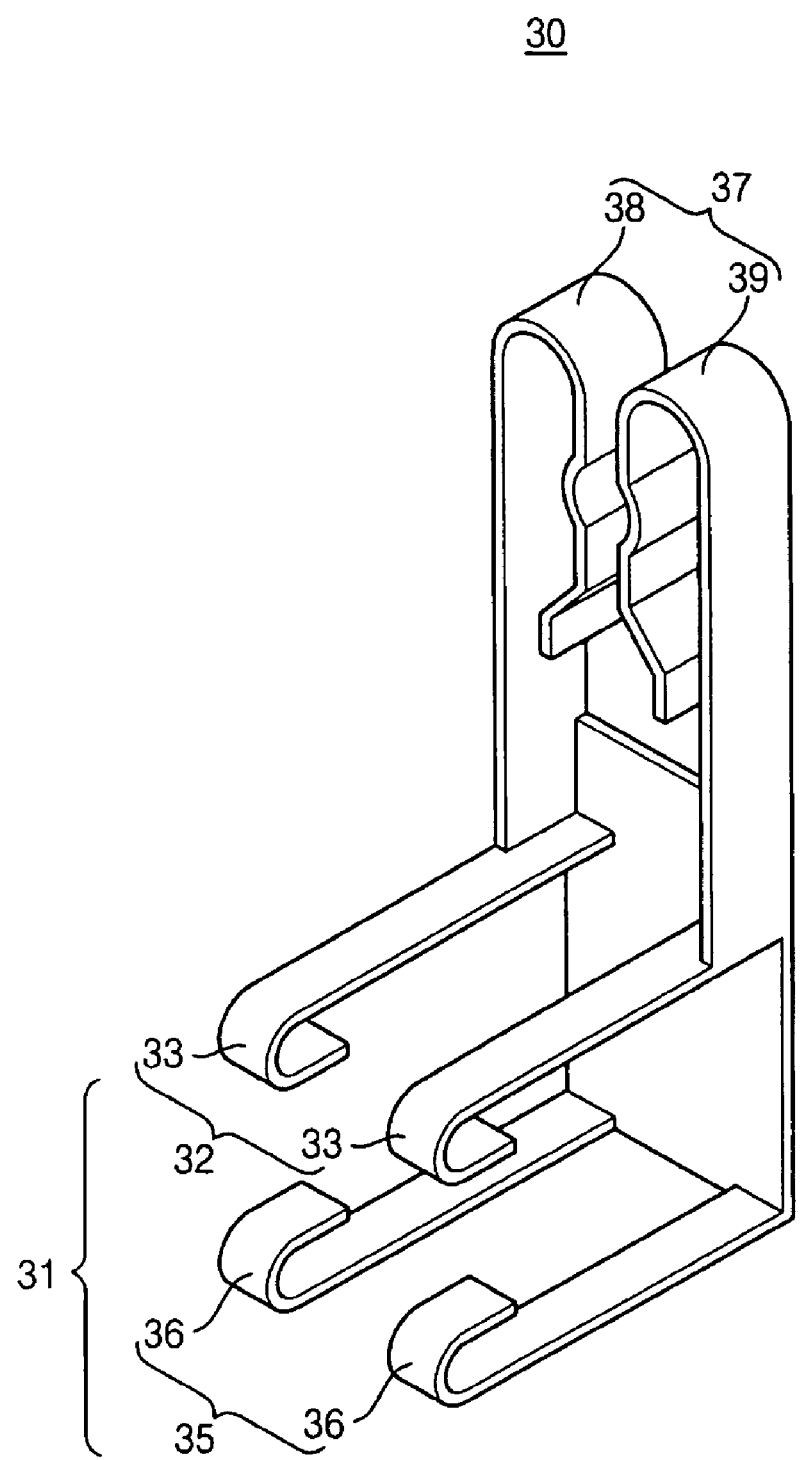
FIG. 2 is a perspective view illustrating the power connector illustrated in FIG. 1.

FIG. 1 is a perspective view illustrating a lamp holder according to an exemplary embodiment of the present invention. FIG. 2 is a perspective view illustrating the power connector illustrated in FIG. 1.

Referring to FIGS. 1 and 2, a lamp holder 10 fastens a lamp 3 that provides a back light for an LCD device and includes a power source for lamp 3.

The lamp holder 10 includes a holder body 11 and a power connector 30.

The power connector 30 is disposed at a recess formed on the lamp holder 10.

The holder body 11 is advantageously formed by injection molding. Holder body 11 has, for example, a hexahedron shape. In an exemplary embodiment, the holder body 11 includes an upper face 12, a lower face 13 facing the upper face 12, and first, second, third and fourth side faces 14, 15, 16 and 17 connecting the upper face 12 and the lower face 13. The first side face 14 and the second side face 15 face each other. The third side face 16 and the fourth side face 17 face each other and are connected to the first side face 14 and the second side face 15.

A lamp guide groove 21 having a predetermined depth is formed on the upper face 12 of the holder body 11 and an inverter insertion groove 23 is formed on a lower portion of the holder body 11. The lamp guide groove 21 is disposed and extended to a first direction opposite to the recess formed on the lamp holder 10, and the inverter insertion groove 23 is disposed and extended to a second direction opposite to the recess formed on the lamp holder 10.

In an exemplary embodiment, the lamp guide groove 21 is open to the first side face 14. The lamp guide groove 21 may be rounded to have a shape corresponding to the lamp 3. The inverter insertion groove 23 is recessed from a lower portion of the first side face 14 toward the second side face 15 by a predetermined depth, and is open to the third side face 16 and the fourth side face 17.

Figure 3:
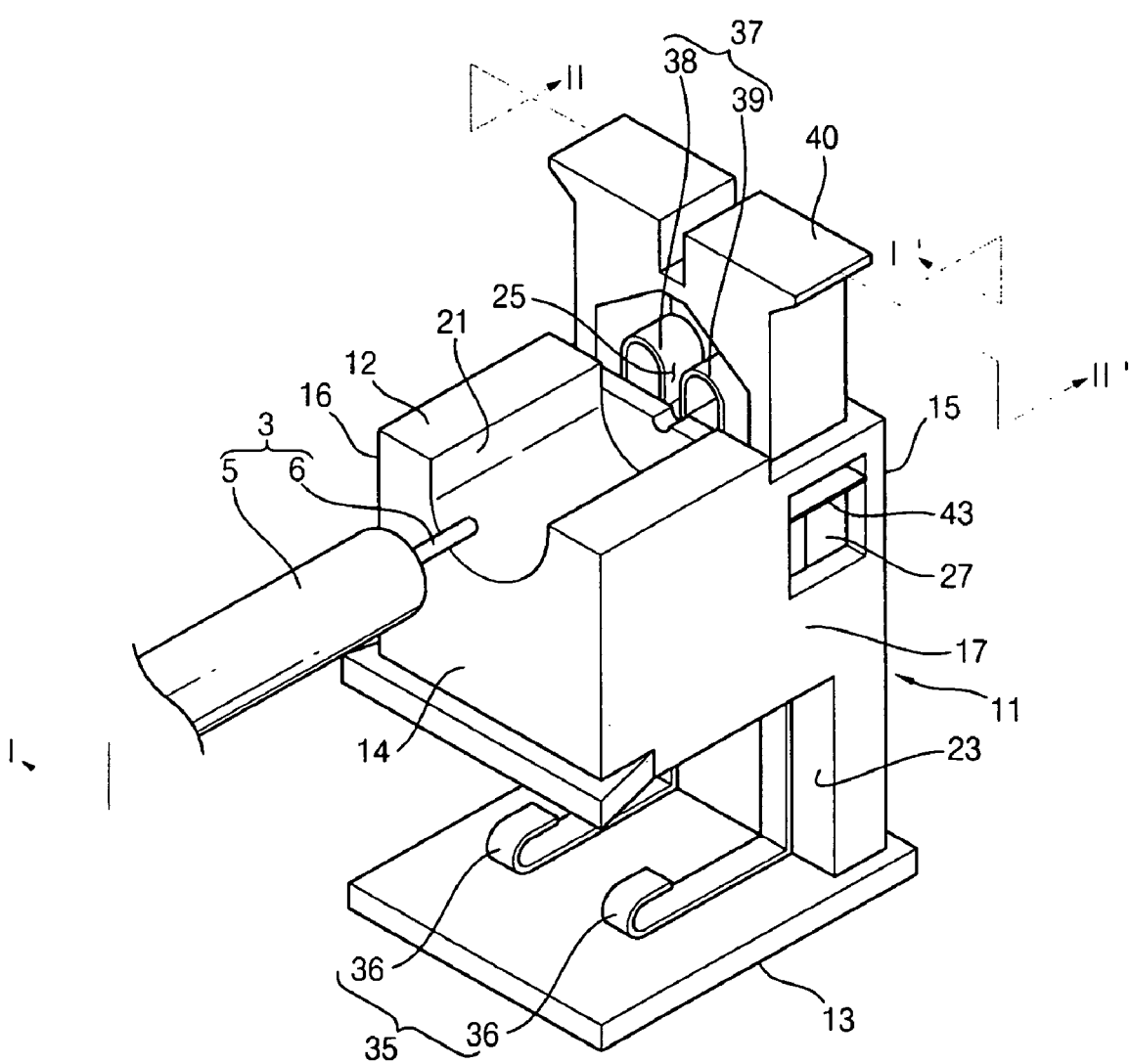
FIG. 3 is an exploded perspective view illustrating the lamp holder illustrated in FIG. 1.
Figure 4:
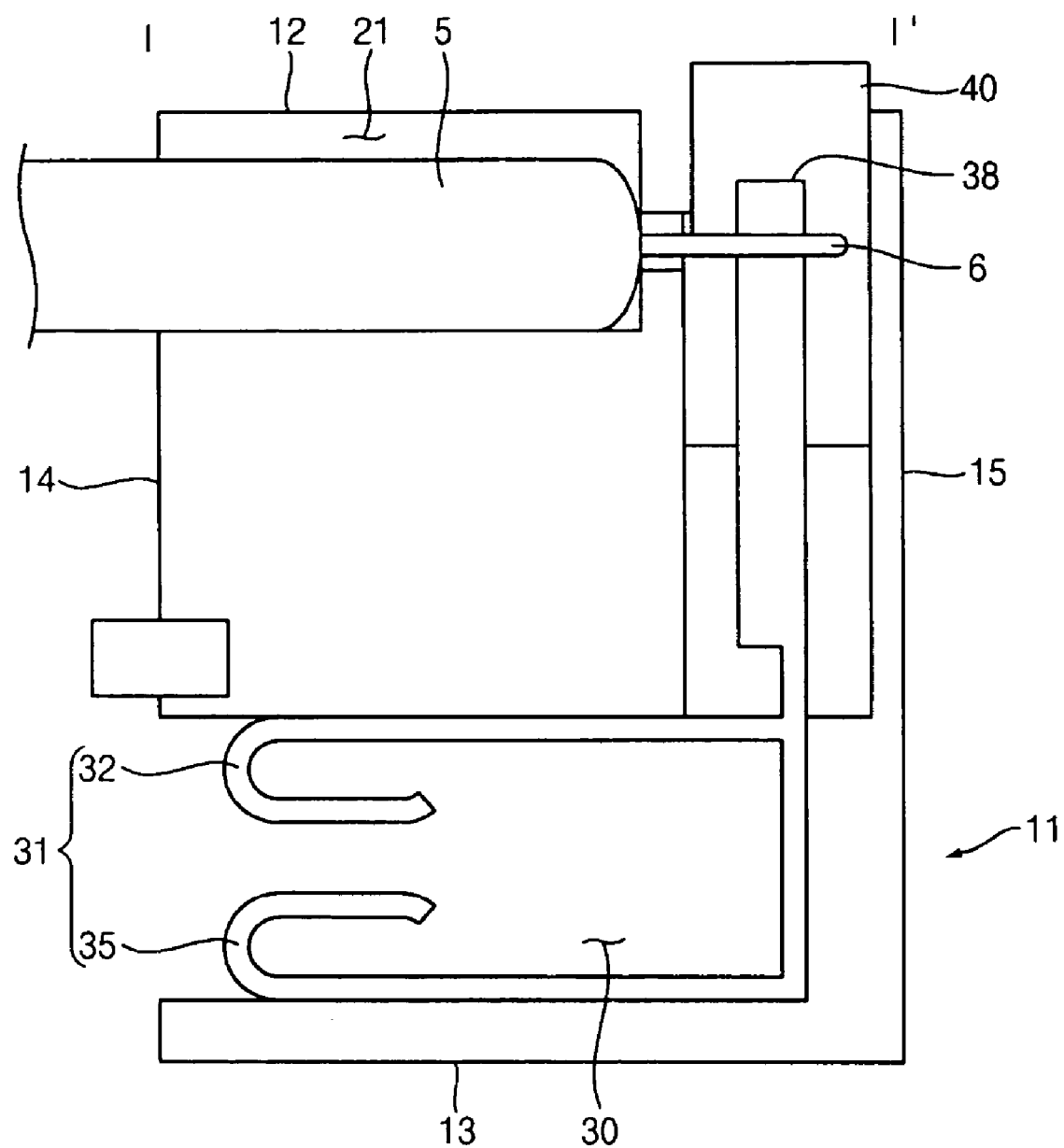
FIG. 4 is a cross-sectional view taken along a line I-I' in FIG. 3.

FIG. 3 is an exploded perspective view illustrating the lamp holder illustrated in FIG. 1. FIG. 4 is a cross-sectional view taken along a line I-I' in FIG. 3.

Referring to FIGS. 2 to 4, the holder body 11 has a connection hole 25 and a coupling hole 27. The connection hole 25 corresponds to the recess formed on the lamp holder 10. The connection hole 25 is formed through the upper face 12, and is open to the inverter insertion groove 23. The coupling hole 27 is formed through the third and fourth side faces 16 and 17, and is open to the connection hole 25.

The power connector 30 is made of a conductive metal and disposed in the connection hole 25. The power connector 30 includes a first terminal portion (hereinafter, referred to as 'power input portion') 31 and a second terminal portion (hereinafter, referred to as 'power output portion') 37, which are electrically connected to each other.

The inverter insertion groove 23 is recessed to a predetermined depth to expose the power input portion 31 to the inverter insertion groove 23. The power output portion 37 is disposed adjacent to the lamp guide groove 21. The power input portion 31 is bent from the connection hole 25 to the second direction of the inverter insertion groove 23 at a lower portion of the power input portion 31. The power input portion 31 includes a first connection portion 32 and a second connection portion 35. The first connection portion 32 is disposed at an upper portion of a receiving space defined by the inverter insertion groove 23, and the second connection portion 35 is disposed at a lower portion of the receiving space.

The power input portion 31 has an inverter catching structure. The inverter catching structure has, for example, a hook shape.

In an exemplary embodiment, the first connection portion 32 includes two first connection terminals 33 having substantially the same shape, and the second connection portion 35 includes two second connection terminals 36 having substantially the same shape. Alternatively, the first connection portion 32 and the second connection portion 35 may include more than two terminal portions.

The first connection portion 32 includes a plurality of first connection terminals 33 extending from the second side face 15 toward the first side face 14, and the second connection portion 35 includes a plurality of second connection terminals 36 extending from the second side face 15 toward the first side face 14. For example, an end portion of the first connection terminals 33 and an end portion of the second connection terminals 36, which are near the first side face 14, have a hook shape.

Figure 5:
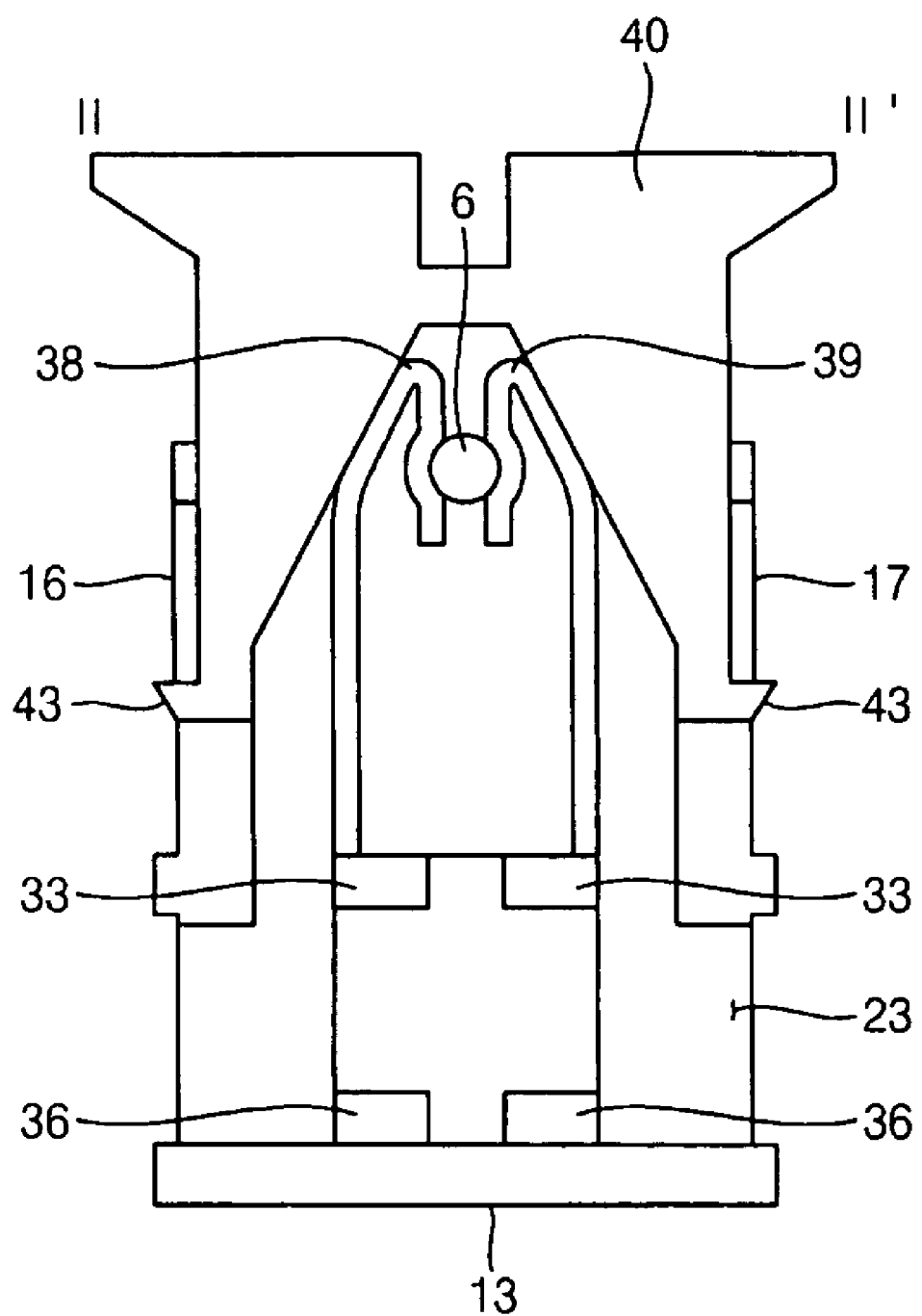
FIG. 5 is a cross-sectional view taken along a line II-II' in FIG. 3.

FIG. 5 is a cross-sectional view taken along a line II-II' in FIG. 3.

Referring to FIGS. 3 to 5, the power output portion 37 includes a wire catching portion located near the lamp guide groove 21 and holding a wire of the lamp 3 which is located at the outer end of the lamp 3. In an exemplary embodiment, the power output portion 37 is disposed at both sides of a lead 6 of the lamp 3, the lead being exposed to the connection hole 25 and disposed over the lamp guide groove 21. The power output portion 37 includes a first power terminal 38 and a second power terminal 39. The first power terminal 38 extends to an upper portion of the connection hole 25, and is bent along a first side of the lead 6 toward a lower portion of the connection hole 25. The second power terminal 39 faces the first power terminal 38, and is bent along a second side of the lead 6 toward a lower portion of the connection hole 25.

The lamp holder 10 may further include a holder cap 40. The holder cap 40 is inserted into the connection hole 25 in a third direction from the lamp guide groove 21 to the inverter insertion groove 23. The holder cap 40 presses the power output portion 37 to thereby make contact with the lead 6 of the lamp 3.

The holder cap 40 includes first and second fixing sections substantially symmetrical to each other. Upper portions of the first and second fixing sections are connected to each other, and lower portions of the first and second fixing section are spaced apart from each other by a predetermined interval. Fixing hooks 43 are formed on the lower portions of the first and second fixing sections. The first fixing section and the second fixing section include first and second inclined faces, respectively, facing each other.

When the first fixing section and the second fixing section are inserted into the connection hole 25, the fixing hooks 43 are inserted into the corresponding coupling holes 27 formed through the holder body 11. The fixing hooks 43 are coupled to the coupling hole 27 to upwardly and downwardly slide with the fixing hooks being inserted into the coupling hole 27. When the holder cap 40 is inserted into the connection hole 25, the first and second inclined faces press the power input portion 31 including the first power terminal 38 and the second power terminal 39. Thus, the first power terminal 38 and the second power terminal 39 make contact with and surround a portion of the lead 6 of the lamp 3.

Figure 6:
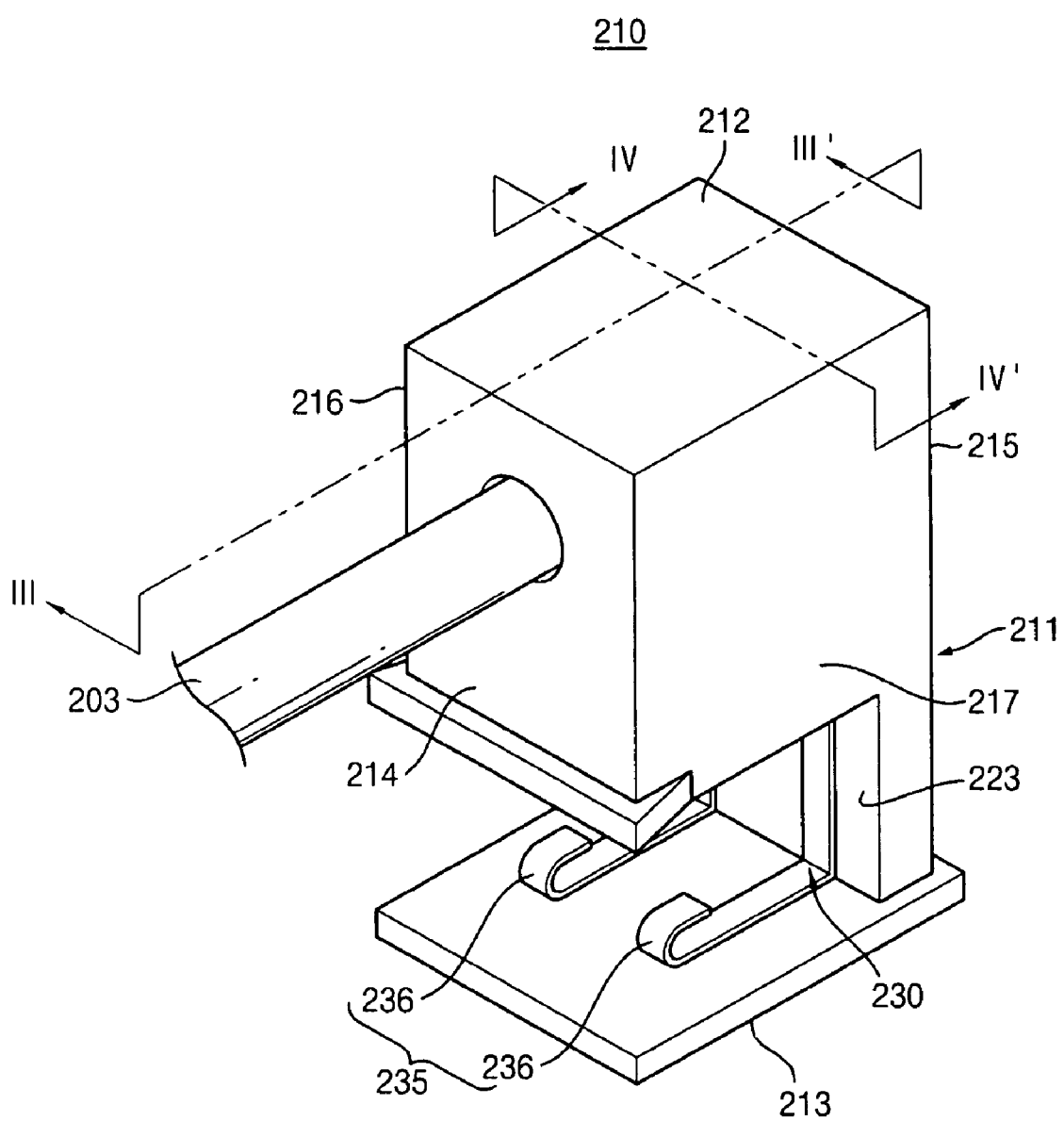
FIG. 6 is a perspective view illustrating a lamp holder according to another exemplary embodiment of the present invention.
Figure 7:
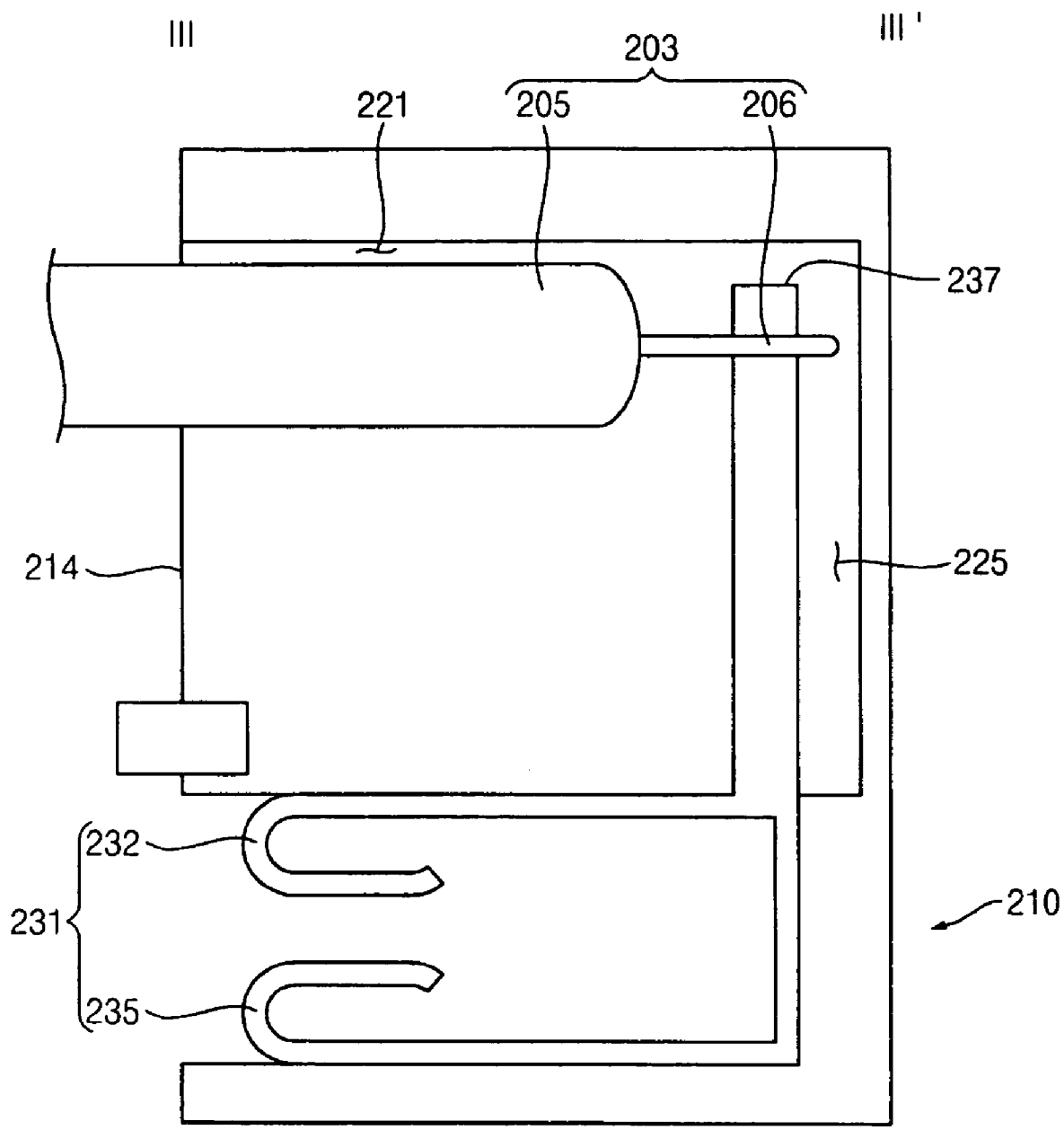
FIG. 7 is a cross-sectional view taken along a line III-III' in FIG. 6.

FIG. 6 is a perspective view illustrating a lamp holder according to another exemplary embodiment of the present invention. FIG. 7 is a cross-sectional view taken along a line III-III' in FIG. 6.

Referring to FIGS. 6 and 7, a lamp holder 210 includes a holder body 211 and a power connector 230.

The holder body 211 is substantially the same as the holder body 11 illustrated in FIG. 1 except for a shape of a lamp guide groove 221 and a shape of a connection hole 225. Thus, the holder body 211 has a substantially hexahedron shape, and includes an upper face 212, a lower face 213 facing the upper face 212, and first, second, third and fourth side faces 214, 215, 216 and 217 connecting the upper face 212 and the lower face 213.

A lamp guide groove 221 and an inverter insertion groove 223 are formed on the holder body 211. The lamp guide groove 221 is formed on an upper portion of the holder body 211. Particularly, the lamp guide groove 221 extends from the first side face 214 toward the second side face 214, and is recessed by a predetermined depth.

The inverter insertion groove 223 is formed on the first side face 214 and positioned under the lamp guide groove 221. The inverter insertion groove 223 is recessed from a lower portion of the first side face 214 toward the second side face 214 by a predetermined depth, and open to the third side face 216 and the fourth side face 217.

A connection hole 225 may be formed in the holder body 211. The connection hole 225 is open to the lamp guide groove 221 and the inverter insertion groove 223.

Figure 8:
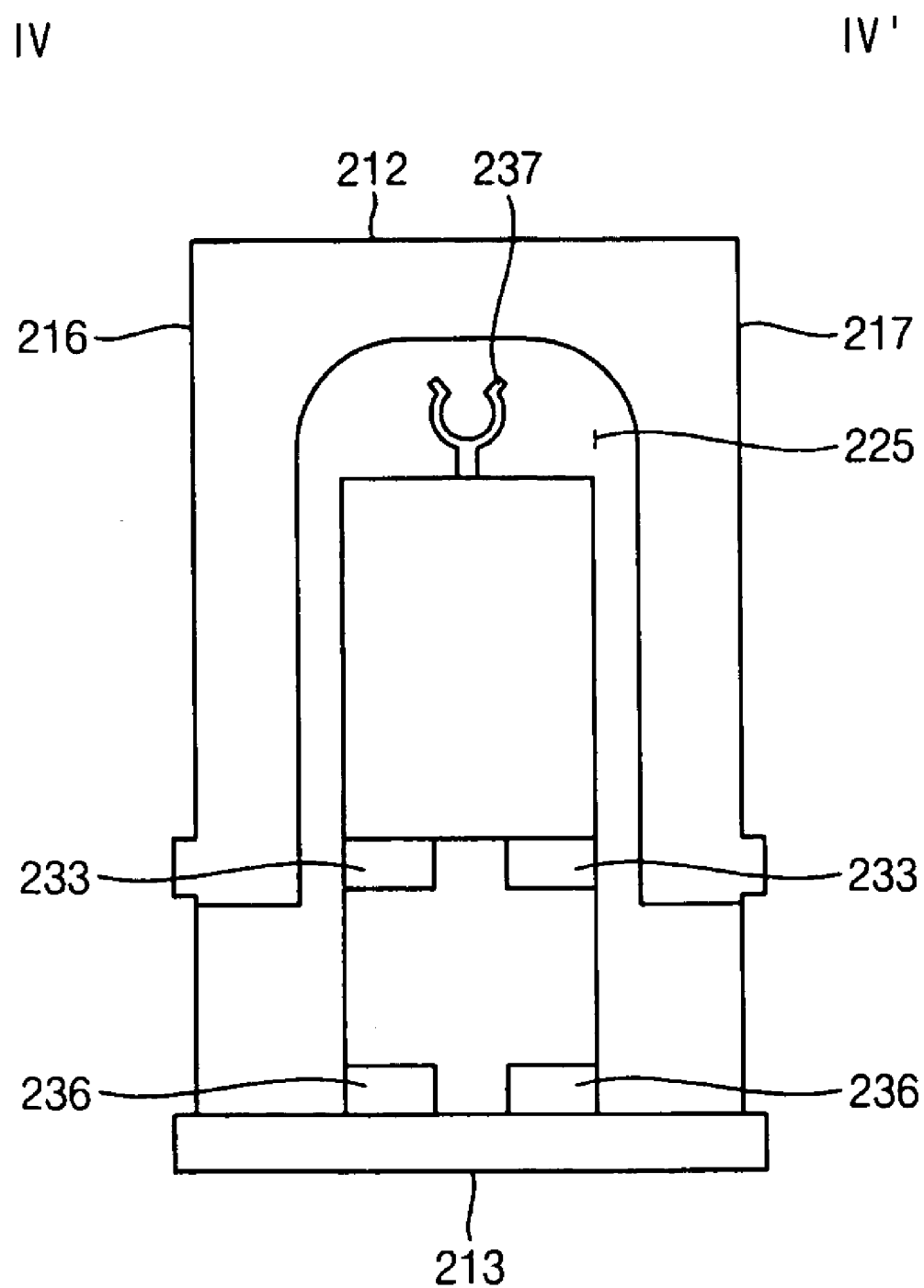
FIG. 8 is a cross-sectional view taken along a line IV-IV' in FIG. 6.

FIG. 8 is a cross-sectional view taken along a line IV-IV' in FIG. 6.

Referring to FIGS. 6 to 8, the power connector 230 is substantially the same as the power connector 30 illustrated in FIG. 2 except for the shape of power output portion 237. Thus, the power connector 230 is disposed in the connection hole 225 and includes a power input portion 231 and a power output portion 237.

The power input portion 231 includes a first connection portion 232 and a second connection portion 235. The power input portion 231 is substantially the same as the power input portion 31 illustrated in FIGS. 2 to 5. The power output portion 237 extends from the power input portion 231, and is exposed to the lamp guide groove 221. The power output portion 237 has, for example, a ring shape, a portion of which is open. The lead 206 of the lamp 203, which is inserted into the lamp guide groove 221, is placed onto the power output portion 237.

Power Supply Module

Figure 9:
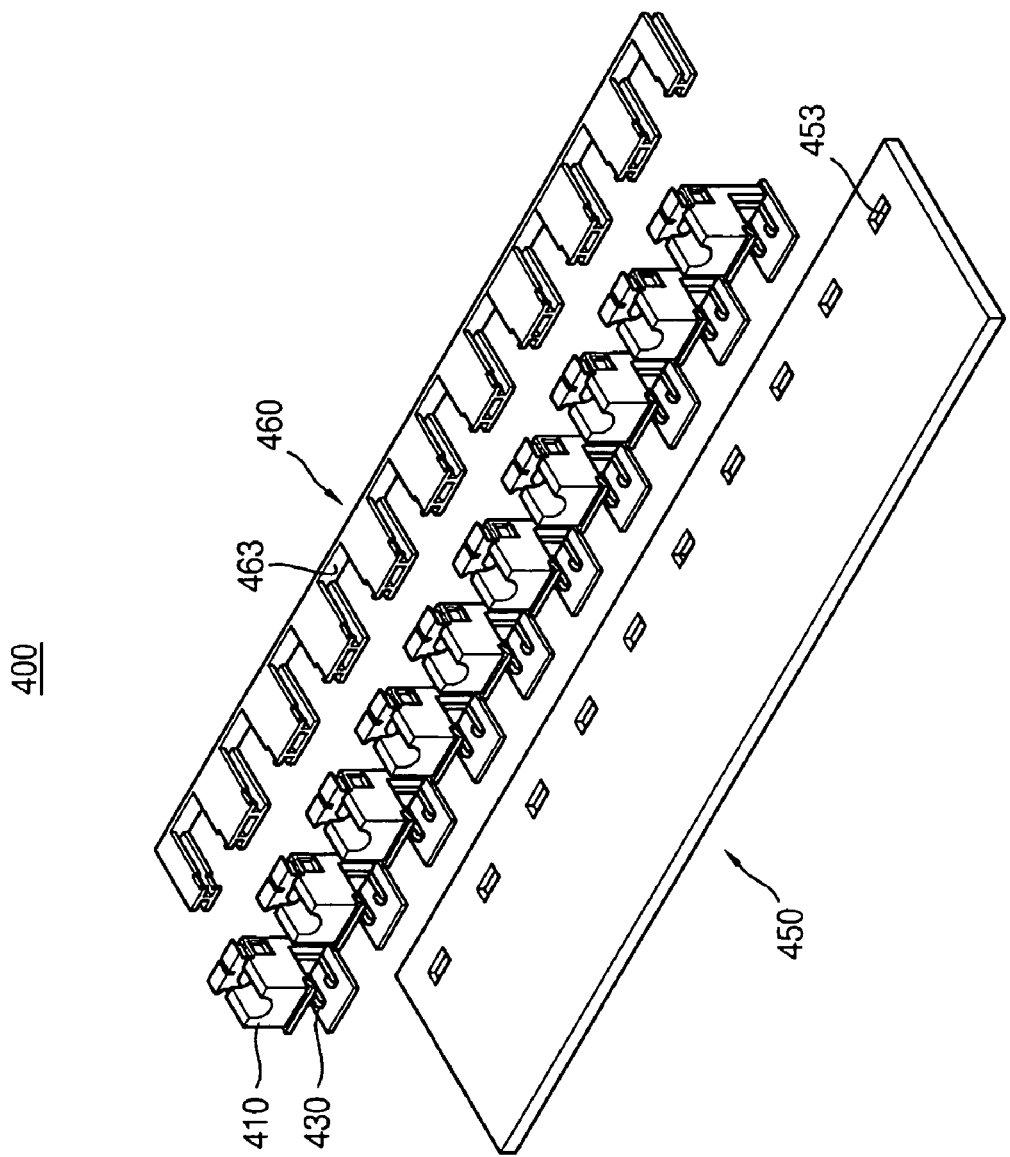
FIG. 9 is an exploded perspective view illustrating a power supply module according to an exemplary embodiment of the present invention.
Figure 10:
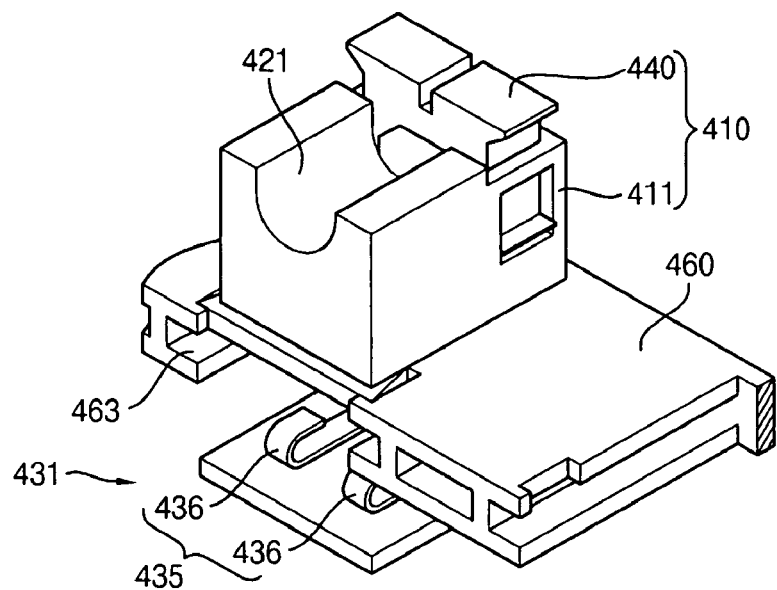
FIG. 10 is a perspective view illustrating coupling of the lamp holder and the insulation plate illustrated in FIG. 9.
Figure 11:
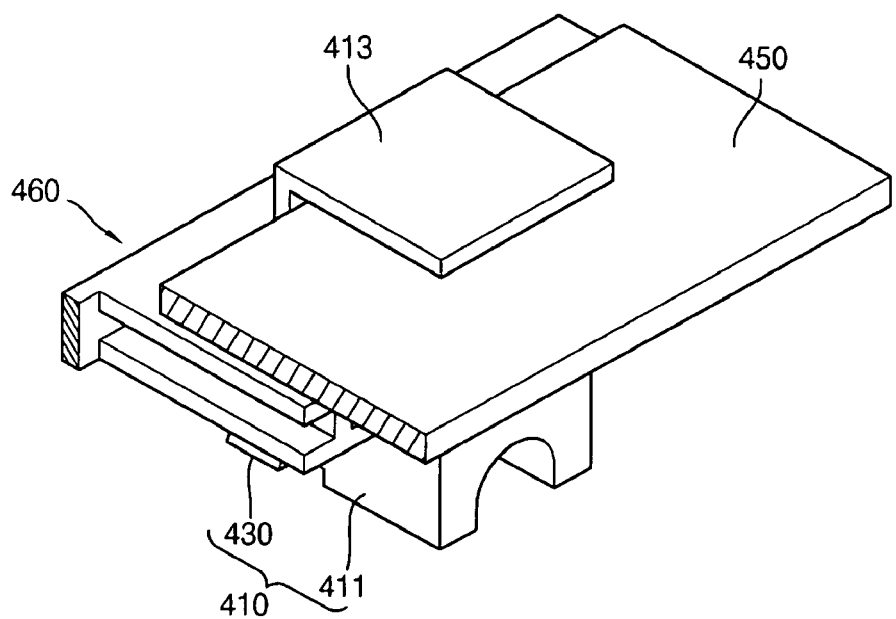
FIG. 11 is a rear perspective view illustrating the power supply module illustrated in FIG. 9.

FIG. 9 is an exploded perspective view illustrating a power supply module according to an exemplary embodiment of the present invention. FIG. 10 is a perspective view illustrating coupling of the lamp holder and the insulation plate illustrated in FIG. 9. FIG. 11 is a rear perspective view illustrating the power supply module illustrated in FIG. 9.

Referring to FIG. 9, a power supply manifold 400 includes a power supply board 450 and a plurality of lamp holders 410. The lamp holders 410 are substantially the same as the lamp holder 10 illustrated in FIGS. 1 to 5.

Thus, the lamp holder 410 includes a holder body 411 and a power connector 430. A lamp guide groove 421 is formed on an upper portion of the holder body 411, and an inverter insertion groove 423 is formed on a lower portion of the holder body 411. The holder body 411 includes a connection hole that is formed on the upper face 412 of the holder body 411 and is open to the inverter insertion groove 423. The power connector 430 includes a power input portion 431 and a power output portion (not shown), and the power input portion 431 includes a first connection portion (not shown) and a second connection portion 435.

The first connection portion is disposed at an upper portion of a receiving space defined by the inverter insertion groove 423, and the second connection portion 435 is disposed at the receiving space. The first connection portion includes a plurality of first connection terminals (not shown) extending from a second side face toward a first side face, and the second connection portion 435 includes a plurality of second connection terminals 436 extending from the second side face toward the first side face. An end portion of the first connection terminals and an end portion of the second connection terminals 436, which are near the first side face, have a hook shape.

Referring to FIG. 11, the power supply board 450 is electrically connected to the power input portion 431 to apply a power source to the lamp holder 410. The power supply board 450 may include a printed circuit board (PCB) and a power supply element mounted on the PCB. A plurality of power output terminals 453 is formed along an edge of the power supply board 450. For example, the power output terminals 453 include a conductive wiring formed on the PCB, a portion of which may be exposed to a surface of the power supply board 450.

In an exemplary embodiment, the power output terminals 453 are formed on an upper surface 412 of the power supply board 450. Alternatively, the power output terminals 453 may be formed on a rear surface of the power supply board 450. Alternatively, the power output terminals 453 may be formed on the upper surface 412 and the rear surface of the power supply board 450.

Referring to FIG. 10, the power supply manifold 400 may further include an insulation plate 460. The insulation plate 460 may be fabricated of, for example, a resin having electrically insulating characteristics. The insulation plate 460 faces the power supply board 450, and extends along the power supply board 450. A plurality of fixing grooves 463 is formed on the insulation plate 460 corresponding to the power output terminals 453.

The fixing grooves 463 are recessed from an edge corresponding to a long side of the insulation plate 460 by a predetermined depth, and open to an upper face and a lower face of the insulation plate 460. The lamp holders 410 are slidably inserted into and fastened to the fixing grooves 463.

Figure 12:
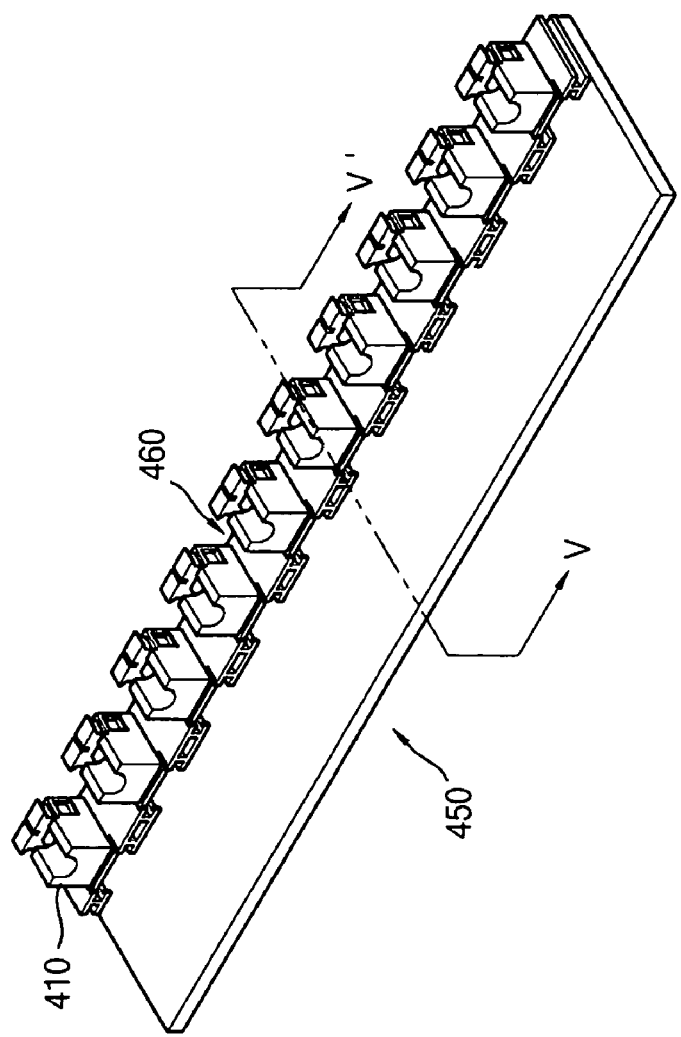
FIG. 12 is a perspective view illustrating the power supply module illustrated in FIG. 9.
Figure 13:
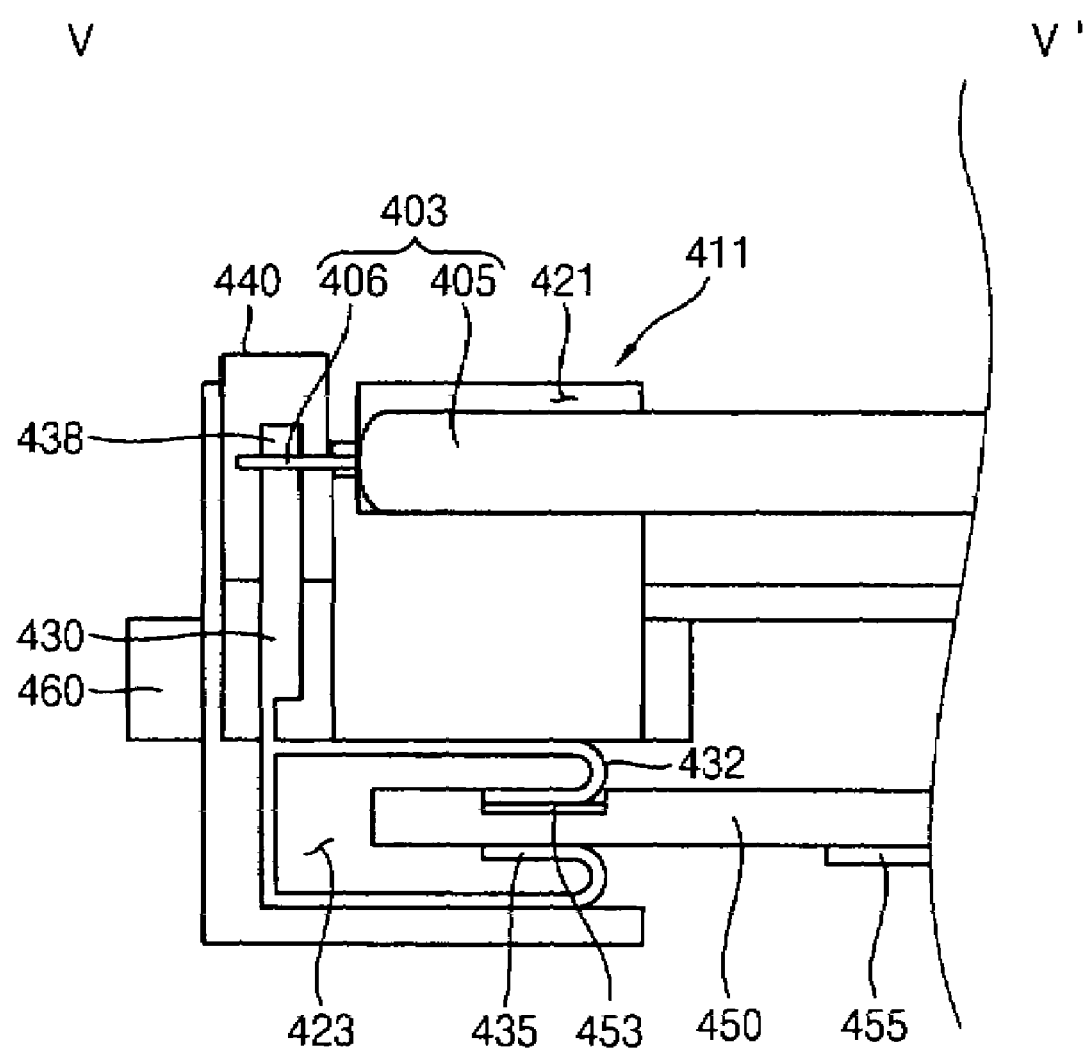
FIG. 13 is a cross-sectional view taken along a line V-V' in FIG. 12.

FIG. 12 is a perspective view illustrating the power supply module illustrated in FIG. 9. FIG. 13 is a cross-sectional view taken along a line V-V' in FIG. 12.

Referring to FIGS. 12 and 13, the power supply board 450 is slidably inserted into the inverter insertion grooves 423 of the lamp holders 410 fastened to the insulation plate 460. The first connection portion of the power connector 430 makes contact with the power output terminal 453 formed on the power supply board 450, and the second connection portion 435 of the power connector 430 makes contact with the rear surface of the power supply board 450.

Since the first connection portion and the second connection portion 435 have a hook shape, when the power supply board 450 is inserted into the inverter insertion groove 423, shock is absorbed into the first connection portion and the second connection portion 435 having the hook shape to thereby prevent damage of the first connection portion and the second connection portion 435.

An end portion of a lamp 403 is guided by the lamp guide groove 421, and a lead 406 of the lamp 403 is inserted into the power output portion of the power connector 430. Therefore, the power supply board 450, the lamp holder 410 and the lamp 403 are electrically connected.

Backlight Assembly

Figure 14:
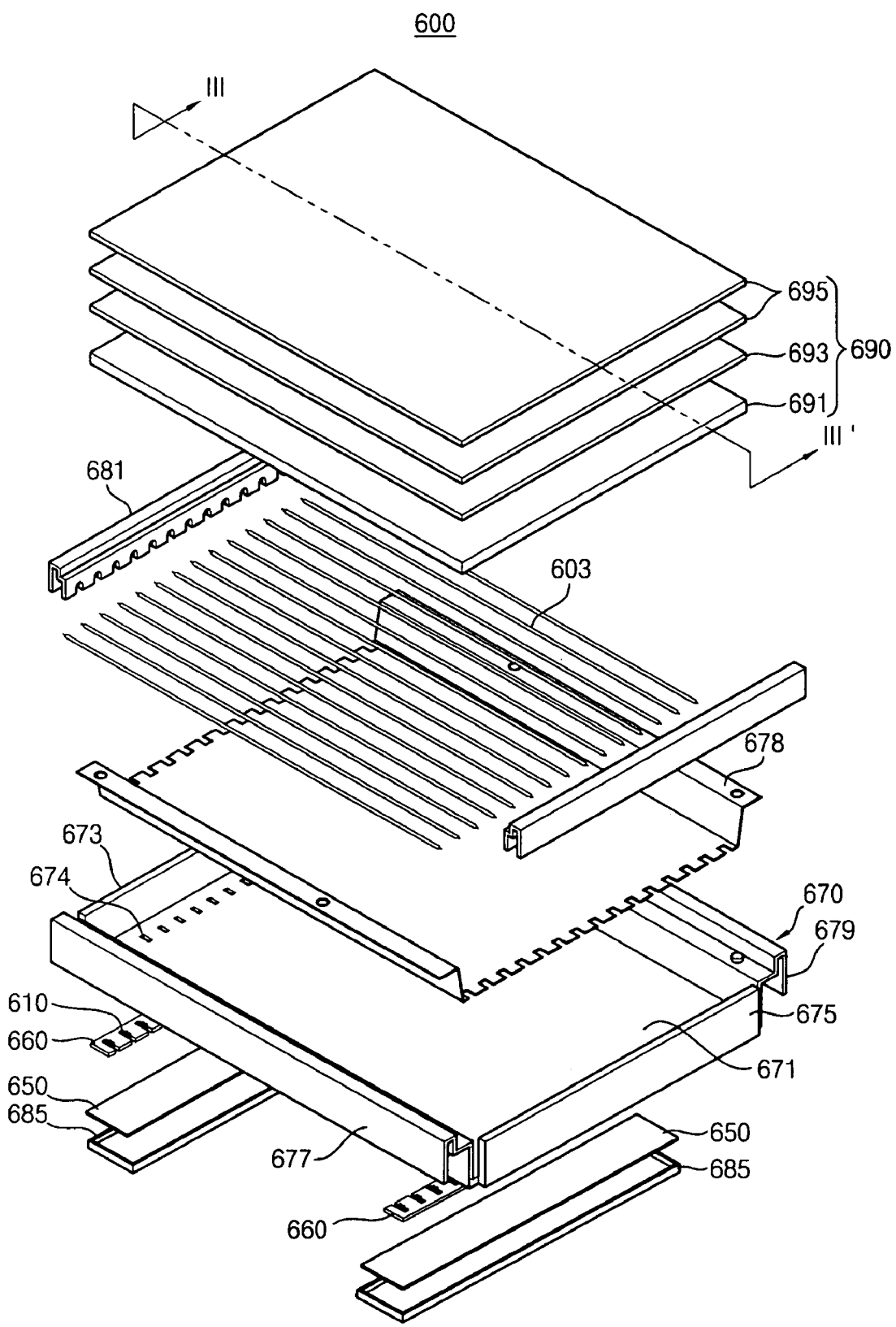
FIG. 14 is an exploded perspective view illustrating a backlight assembly according to an exemplary embodiment of the present invention.

FIG. 14 is an exploded perspective view illustrating a backlight assembly according to an exemplary embodiment of the present invention.

Referring to FIG. 14, a backlight assembly 600 includes a plurality of 20 lamp holders 610, a receiving container 670, a plurality of lamps 603 and a power supply board 650.

The lamp holders 610 are substantially the same as the lamp holders 410 illustrated in FIGS. 9 to 13.

The receiving container 670 includes a bottom plate 671 and first, second, third and fourth sidewalls 673, 675, 677 and 679. The first and second sidewalls 673 and 675 face each other. The third and fourth sidewalls 677 and 679 face each other, and connect the first and second sidewalls 673 and 675. A stepped portion is formed on an upper portion of the third and fourth sidewalls 677 and 679. A plurality of openings 674 is formed through the bottom plate 671 that is near the first sidewall 673 and the second sidewall 675.

The lamps 603 are disposed over the bottom plate 671 and substantially in parallel with each other to generate light. Each of the lamps 603 includes a lamp tube and an electrode portion. For example, the lamp tube has a straight tube shape, and includes a discharge gas such as argon (Ar), mercury (Hg), etc. The electrode portion is positioned at an end portion of the lamp tube.

The electrode portion includes a discharge electrode and a lead. The discharge electrode is disposed in the lamp tube, and the lead extends from the discharge electrode to the outside of the lamp tube. The lamp tube is guided by the lamp guide groove 621. The lead extends from an end portion of the lamp tube and is inserted into the power output portion 637 of the power connector 630. The lead makes contact with the power output portion 637.

The backlight assembly 600 may further include an insulation plate 660. The insulation plate 660 is substantially the same as the insulation plate 460 illustrated in FIGS. 9 to 13. The insulation plate 660 is disposed on a rear surface of the bottom plate 671, and the lamp holders 610 inserted into fixing grooves formed on the insulation plate 660 are inserted into openings 674 formed through the bottom plate 671.

Figure 15:
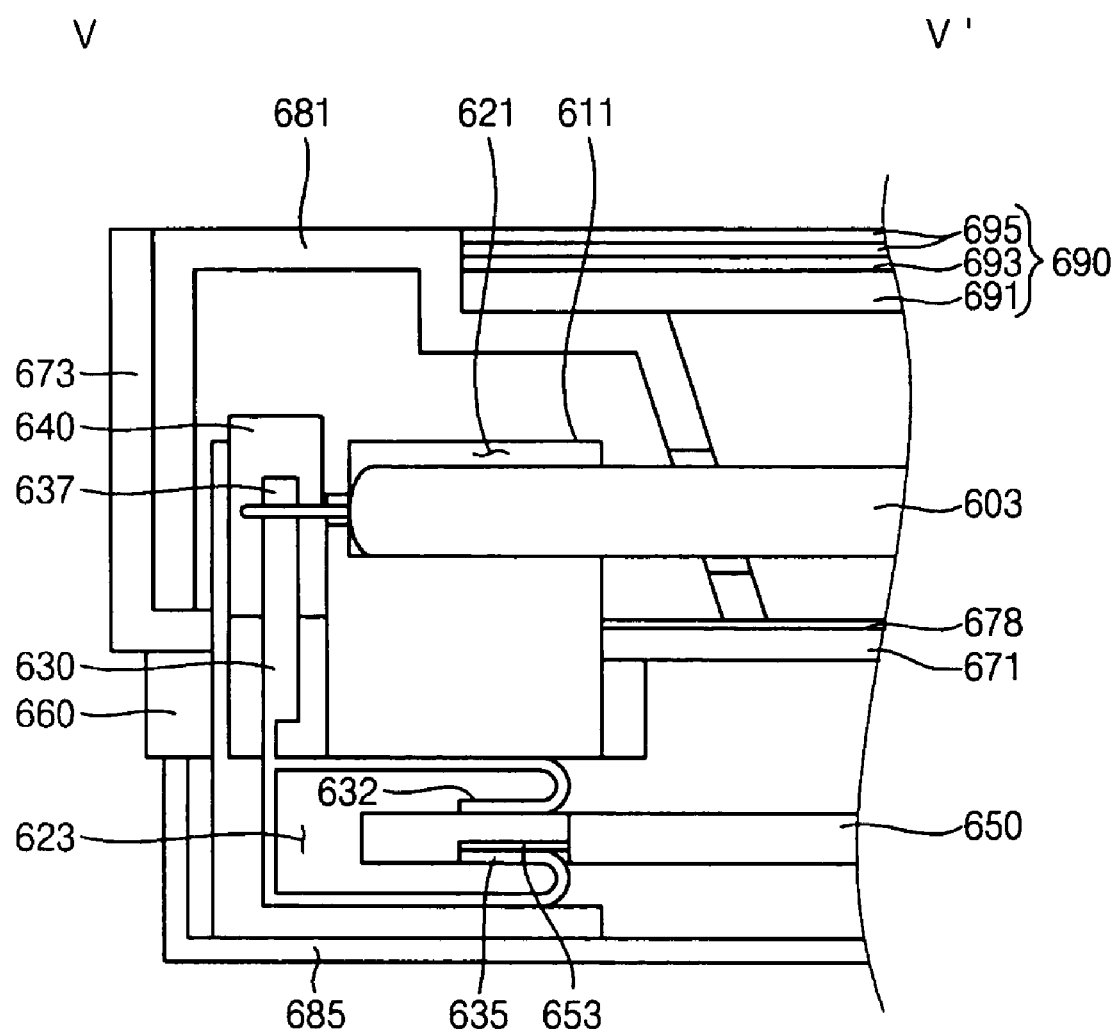
FIG. 15 is a cross-sectional view taken along a line VI-VI' in FIG. 14.

FIG. 15 is a cross-sectional view taken along a line VI-VI' in FIG. 14.

Referring to FIGS. 14 and 15, the power supply board 650 applies a power source to the lamp holders 610. The power supply board 650 is substantially the same as the power supply board 450 illustrated in FIGS. 9 to 13 except for a position of power output terminals 653. In an exemplary embodiment, the power output terminals 653 are formed on a rear surface of the power supply board 650.

The power supply board 650 is disposed under the insulation plate 660. The power supply board 650 is slidably inserted into inverter insertion grooves 623 of the lamp holders 610 fastened to the insulation plate 660. A second connection portion 635 of the power connector 630 makes contact with the power output terminal 653 formed on the rear surface of the power supply board 650, and a first connection portion 632 makes contact with an upper surface of the power supply board 650.

The backlight assembly 600 may further include a protective cover 685, a reflecting plate 678, a side mold 681 and an optical unit 690.

The protective cover 685 covers the power supply board 650 to externally insulate the power supply board 650 and shield electromagnetic wave.

The reflecting plate 678 is disposed on the bottom plate 671 of the receiving container 670 to upwardly reflect the light generated from the lamps 603.

The side mold 681 is disposed on the bottom plate 671 corresponding to the first sidewall 673 and the second sidewall 675 to cover the lamp holders 610. A plurality of grooves is formed on an edge of a lower portion of the side mold 681 to prevent interference between the lamps 603. A stepped portion is formed on an upper portion of the side mold 681.

The optical unit 690 enhances optical characteristics, for example, such as luminance uniformity and front luminance of the light generated from the lamps 603, and the enhanced light is upwardly transmitted. The optical unit 690 is supported by the third sidewall 677, the fourth sidewall 679 and the side mold 681. The optical unit 690 includes a light-diffusing plate 691, a light-diffusing sheet 693 and light-condensing sheets 695. The light-diffusing plate 691, the light-diffusing sheet 693 and the light-condensing sheets 695 are successively disposed.

The light-diffusing plate 691 and the light-diffusing sheet 693 diffuse the light generated from the lamp 603, and the light having enhanced luminance uniformity may exit the light-diffusing plate 691 and the light-diffusing sheet 693. The light-condensing sheets 695 condense the light from the light-diffusing plate 691 in different directions, for example, in substantially perpendicular directions to thereby enhance front luminance of the backlight assembly 600.

Figure 16:
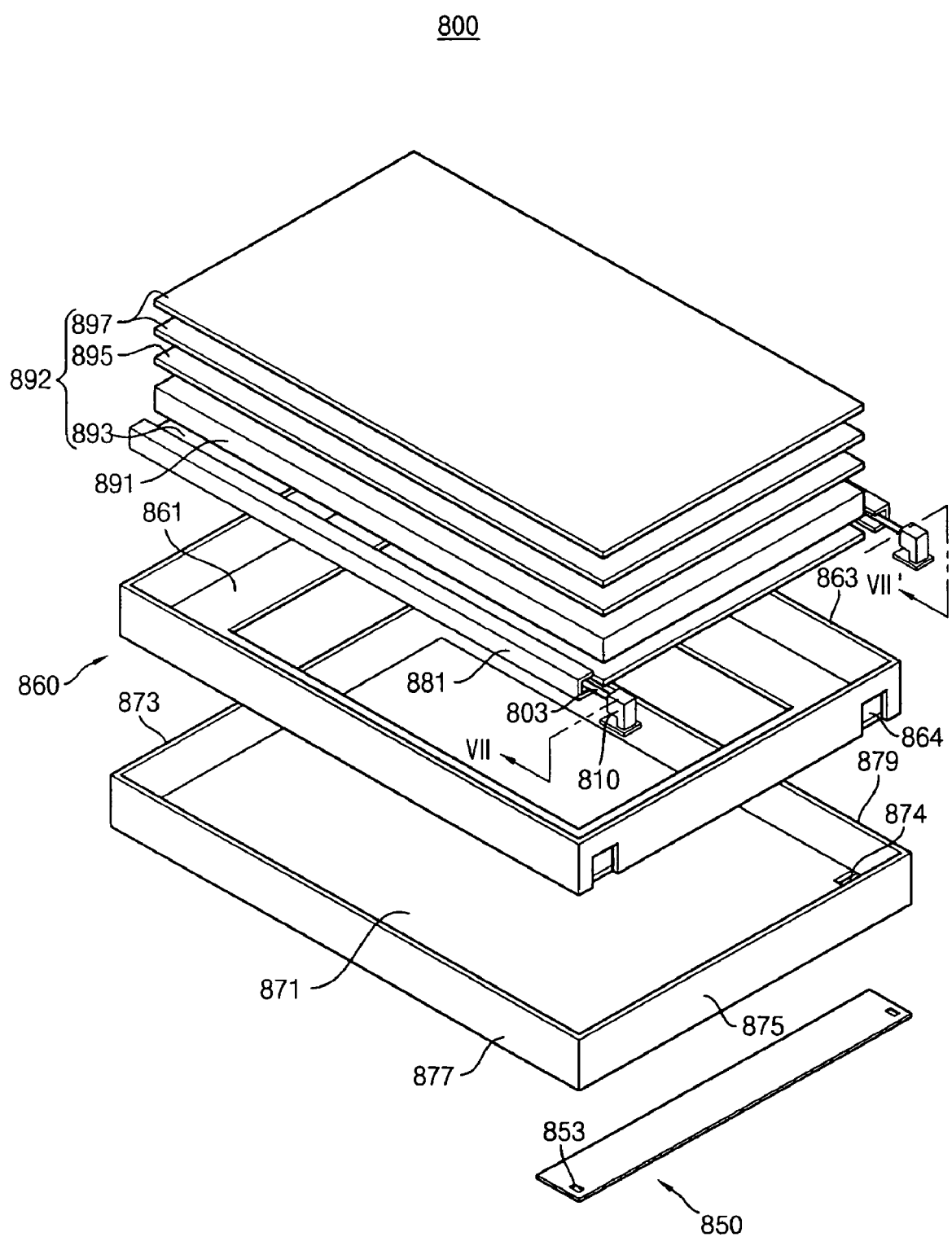
FIG. 16 is an exploded perspective view illustrating a backlight assembly according to another exemplary embodiment of the present invention.

FIG. 16 is an exploded perspective view illustrating a backlight assembly according to another exemplary embodiment of the present invention. Referring to FIG. 16, a backlight assembly 800 includes a plurality of lamp holders 810, a receiving container 870, a plurality of lamps 803 and a power supply board 850.

The lamp holders 810 are substantially the same as the lamp holder 210 illustrated in FIGS. 6 to 8. The receiving container 870 is substantially the same as the receiving container 670 illustrated in FIGS. 14 and 15 except for a shape of a sidewall, and a position and the number of openings 874 formed through a bottom plate 871. Thus, the receiving container 870 includes first, second, third and fourth sidewalls 873, 875, 877 and 879, and the third and fourth sidewalls 877 and 879 has a flat shape, which is different from the third and fourth sidewalls 677 and 679 illustrated in FIG. 14. The openings 874 are formed through four peripheral portions of the bottom plate 871 corresponding to the first, second, third and fourth sidewalls 873, 875, 877 and 879.

The lamps 803 are substantially the same as the lamps 603 illustrated in FIGS. 14 and 15. The backlight assembly 800 may further include a bottom mold frame 860. The bottom mold frame 860 includes a support portion 861 and a frame portion 863. The support portion 861 corresponds to the bottom plate 871, and central portion of the support portion 861 is open. The frame portion 863 extends from an edge of the support portion 861, and corresponds to the first, second, third and fourth sidewalls 873, 875, 877 and 879. An opening 864 is formed through a portion of an edge, at which the support portion 861 and the frame portion 863 meet each other, to easily couple the lamp holder 810 to the bottom mold frame 860.

The bottom mold frame 860 may include a resin having electrically insulating characteristics. The bottom mold frame 860 is received in the receiving container 870. The lamps 803 are disposed at opposite positions of the frame portion 863 of the bottom mold frame 860.

The backlight assembly 800 may further include a lamp reflector 881, a light guiding plate 891 and an optical sheet 892.

The lamp reflector 881 has a substantially C-shaped cross section. The lamp reflector 881 encloses the lamp 803, and reflects the light generated from the lamps 803 toward a receiving space defined by the bottom mold frame 860.

The light guiding plate 891 and the optical sheet 892 guides the light generated from the lamps 803 and upwardly provides the guided light. The optical sheet 892 includes a light-reflecting sheet 893, a light-diffusing sheet 895 and two light-condensing sheets 897. The light-reflecting sheet 893, the light guiding plate 891, the light-diffusing sheet 895 and the light-condensing sheets 897 are successively disposed on or over the support portion 861.

The light guiding plate 891 guides the light that is generated from the lamp 803 and then is incident onto a side face, and upwardly provides the guided light. The light guiding plate 891 includes, for example, a polymer resin having good optical transmissivity, heat resistance, chemical resistance, mechanical strength, etc. Examples of the polymer resin include polymethyl methacrylate, polyamide, polyimide, polypropylene, polyurethane, etc.

The light-reflecting sheet 893 reflects light leaked from a lower surface of the light guiding plate 891 to provide the lower surface of the light guiding plate 891 again. The light-diffusing sheet 895 enhances luminance uniformity of light provided from an upper surface of the light guiding plate 891. The light-condensing sheets 897 enhance front luminance of light provided from the light-diffusing sheet 895.

Figure 17:
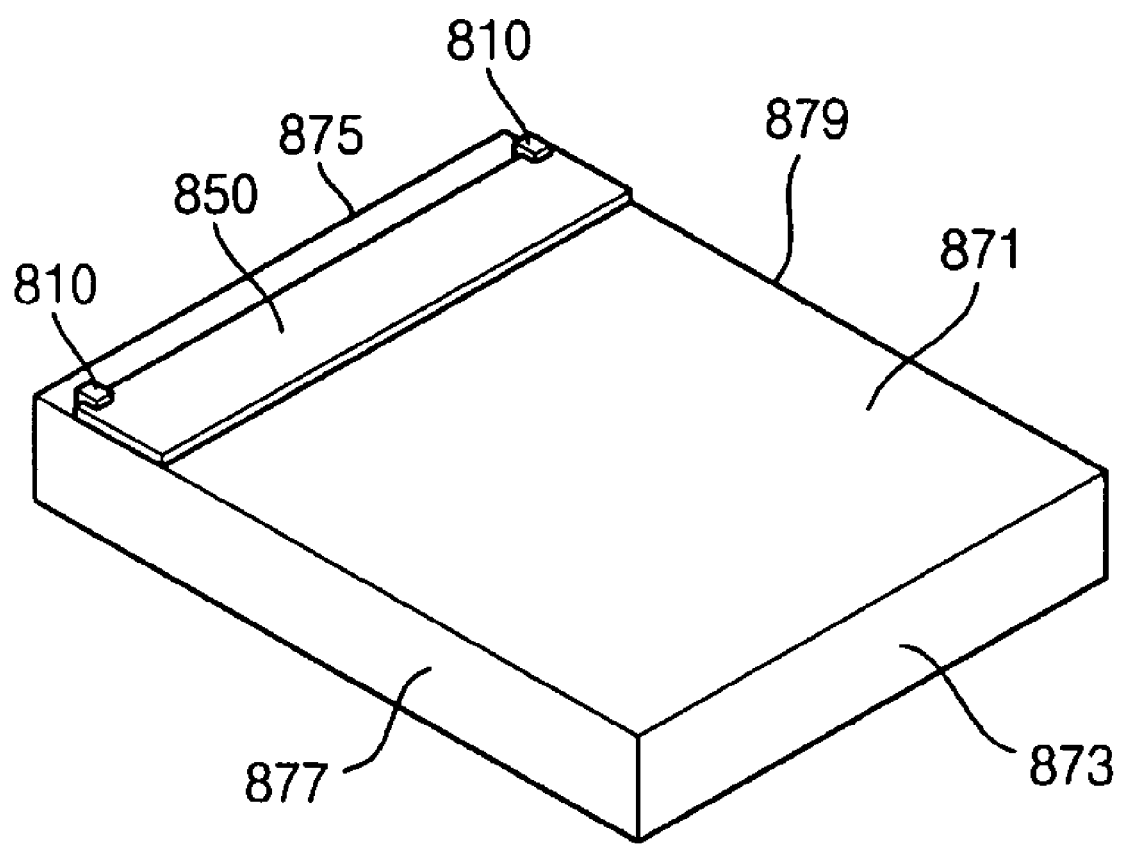
FIG. 17 is a rear perspective view illustrating the backlight assembly illustrated in FIG. 16.
Figure 18:
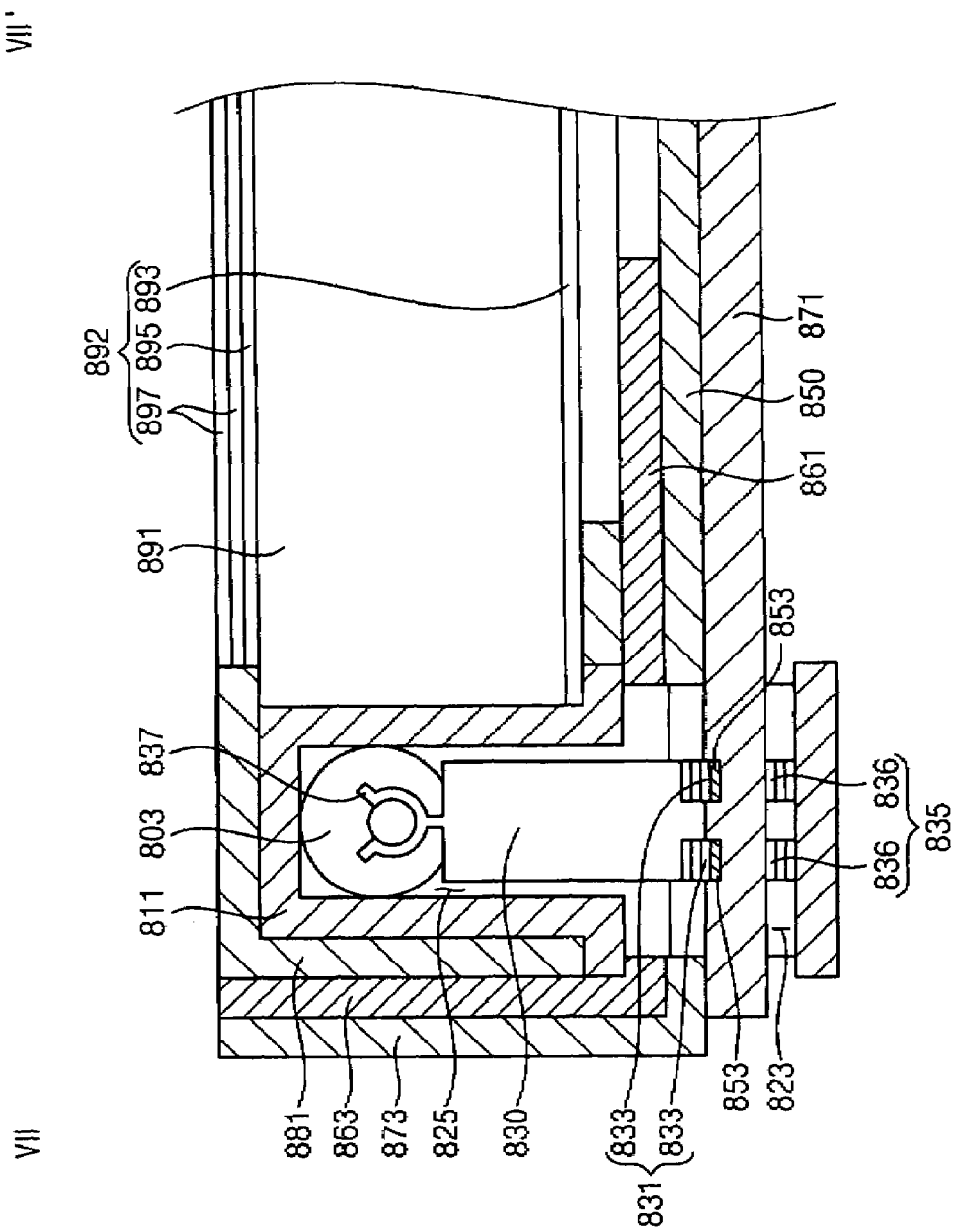
FIG. 18 is a cross-sectional view taken along a line VII-VII' in FIG. 16.

FIG. 17 is a rear perspective view illustrating the backlight assembly illustrated in FIG. 16. FIG. 18 is a cross-sectional view taken along a line VII-VII' in FIG. 16.

Referring to FIGS. 16 to 18, the power supply board 850 is substantially the same as the power supply board 650 illustrated in FIGS. 14 and 15 except that a power output terminal 853 is formed on an upper surface corresponding to the openings 874.

The lamp holder 810 includes a holder body 811 and a power connector 830. As shown in FIG. 6, the holder body 811 includes an upper face, a lower face and first, second, third and fourth side faces. The holder body 811 has a lamp guide groove, an inverter insertion groove 823 and a connection hole 825. The power connector 830 includes a power input portion 831 exposed to the inverter insertion groove 823 and a power output portion 837 disposed in the lamp guide groove.

The lamp holders 810 are coupled to longitudinal end portions of the lamp reflector 881. The lamp 803 is inserted into the lamp guide groove, and a lead 806 of the lamp 803 is inserted into the power output portion 837. The upper face and the fourth side face of the holder body 811 make contact with the lamp reflector 881. A portion of the lamp reflector 881 corresponding to the lower face of the lamp holder 810 is open.

The lamp holder 810 fastened to the lamp reflector 881 is inserted into the opening 864 formed through the edge of the bottom mold frame 860 and the opening 874 formed through the bottom plate 871 of the receiving container 870. As shown in FIG. 18, the inverter insertion groove 823 is exposed to a rear surface of the bottom plate 871. The power supply board 850 is slidably inserted into the inverter insertion groove 823. A first connection portion 832 of the power input portion 831 makes contact with the power output terminal 853 formed on the power supply board 850, and a second connection portion 835 of the power input portion 831 makes contact with a rear surface of the power supply board 850.

Display Device

Figure 19:
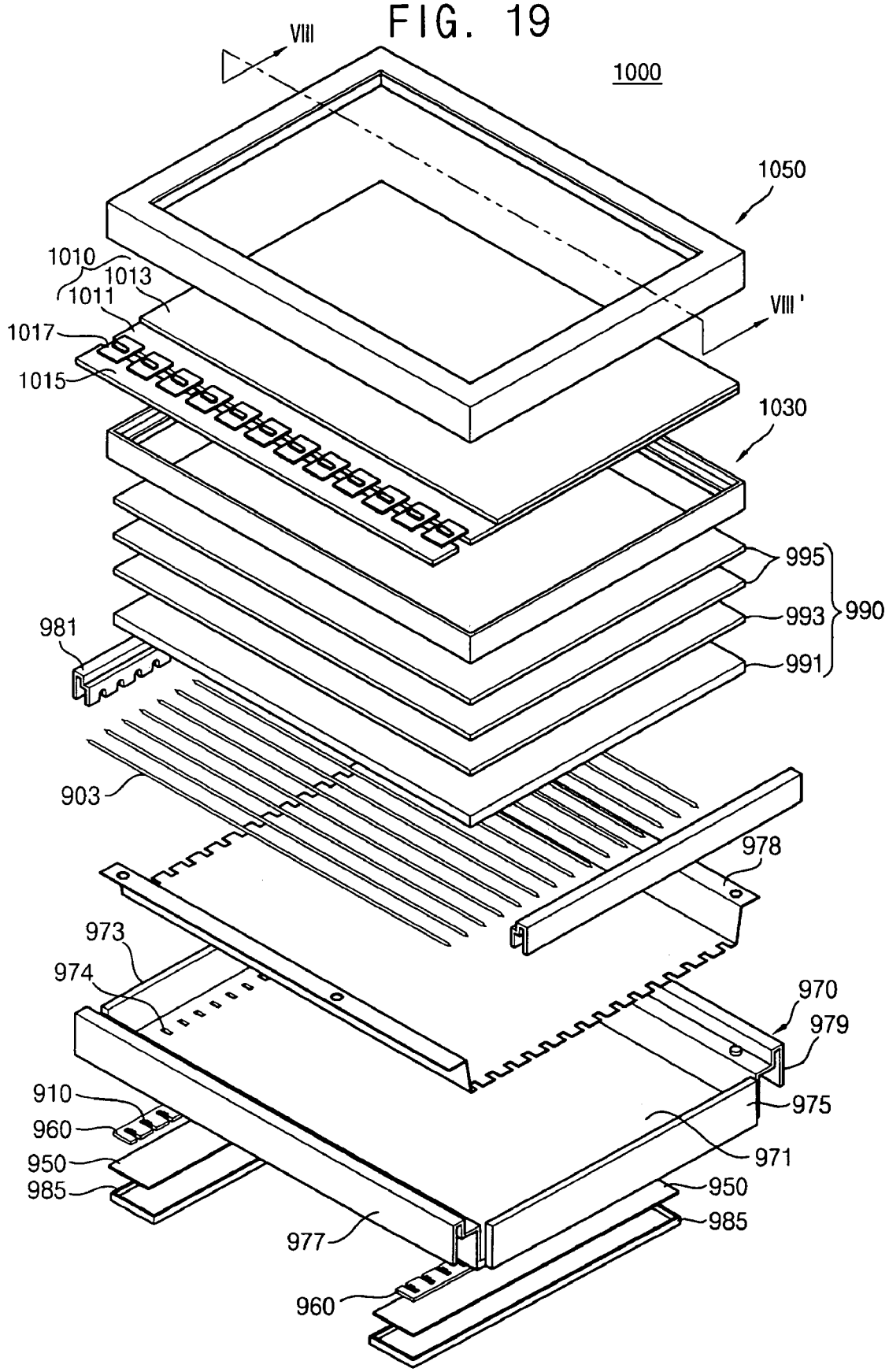
FIG. 19 is an exploded perspective view illustrating a display device according to an exemplary embodiment of the present invention.
Figure 20:
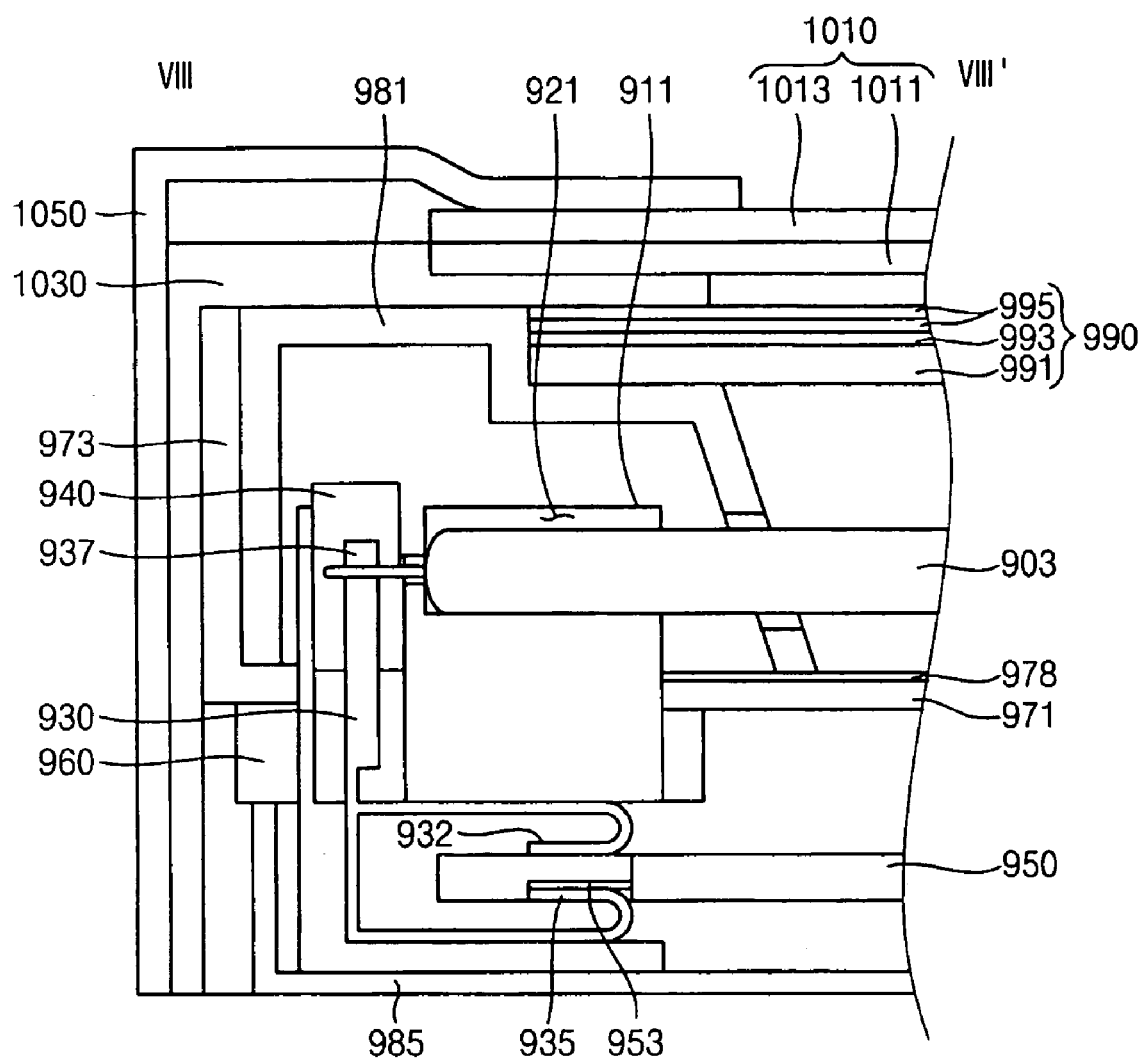
FIG. 20 is a cross-sectional view taken along a line VIII-VIII' in FIG. 19.

FIG. 19 is an exploded perspective view illustrating a display device according to an exemplary embodiment of the present invention. FIG. 20 is a cross-sectional view taken along a line VIII-VIII' in FIG. 19.

Referring to FIGS. 19 and 20, a display device 1000 includes a plurality of lamp holders 910, an insulation plate 960, a receiving container 970, a plurality of lamps 903, a power supply board 950, an optical unit 990 and a display panel 1010.

The lamp holders 910, the insulation plate 960, the receiving container 970, the lamps 903, the power supply board 950 and the optical unit 990 are substantially the same as the lamp holders 610, the insulation plate 660, the receiving container 670, the lamps 603, the power supply board 650 and the optical unit 690 illustrated in FIGS. 14 and 15.

The display device 1000 may further include an insulation plate 960, a protective cover 985, a reflecting plate 978 and a side mold 981. The insulation plate 960, the protective cover 985, the reflecting plate 978 and the side mold 981 are substantially the same as the insulation plate 660, the protective cover 685, the reflecting plate 678 and the side mold 681 illustrated in FIGS. 14 and 15.

The display device 1000 may further include a middle mold frame 1030. The middle mold frame 1030 is coupled to the receiving container 970. The middle mold frame 1030 includes a support section and a side cover section. The support section may have a substantially rectangular frame shape, and pushes an edge portion of the optical unit 990. A stepped portion for placing the display panel 1010 is formed on the support section. The side cover section extends from the support section and is coupled to the first, second, third and fourth sidewalls 973, 975, 977 and 979 of the receiving container 970.

The display panel 1010 displays an image using light provided from the optical unit 990. The display panel 1010 includes a first substrate 1011, a second substrate 1013 facing the first substrate 1011 and a liquid crystal layer disposed between the first substrate 1011 and second substrate 1013.

The display device 1000 may further include a printed circuit board (PCB) 1015 and a connection film 1017. The PCB 1015 provides a driving signal to the display panel 1010. A first edge of the connection film 1017 is electrically connected to an edge of the first substrate 1011, and a second edge of the connection film 1017 is electrically connected to the PCB 1015.

The display device 1000 may further include a top chassis 1050 exposing an effective display area of the display panel 1010. The top chassis 1050 is coupled to at least one of the receiving container 970 and the middle mold frame 1030.

According to the present invention, a lead of a lamp is attachably and detachably coupled to a power output portion of a lamp holder, and a power supply board is slidably inserted into an inverter insertion groove formed on the lamp holder. Thus, soldering process for electrically connecting the lead, the lamp holder and the power supply board may be omitted, thereby improving assemblability of a backlight assembly having the lamp holder and a display device having the lamp holder.

In addition, since a defective inverter may be replaced with a new inverter by separating the defective inverter from the inverter insertion groove, a power supply module having the lamp holder and a backlight assembly having the lamp holder may be easily repaired.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A lamp holder comprising:
   a holder body having a lamp guide groove formed on an upper portion of the holder body, and an inverter insertion groove formed on a lower portion of the holder body; and
   a power connector comprising:
   a first portion exposed to the inverter insertion groove; and
   a second portion disposed adjacent to the lamp guide groove.

2. The lamp holder of claim 1, wherein the power connector is disposed at a first recess of the lamp holder, the lamp guide groove is disposed and extended to a first direction opposite to the first recess, and the inverter insertion groove is disposed and extended to a second direction opposite to the first recess.

3. The lamp holder of claim 2, wherein the inverter insertion groove is recessed to a predetermined depth to expose the first portion of the power connector.

4. The lamp holder of claim 2, wherein the first portion of the power connector is bent from the first recess to the second direction of the inverter insertion groove at a lower portion of the first portion.

5. The lamp holder of claim 4, wherein the first portion of the power connector comprising an inverter catching structure.

6. The lamp holder of claim 5, wherein the inverter catching structure has a hook shape.

7. The lamp holder of claim 2, wherein the second portion comprises a wire catching portion located near the lamp guide groove and holding a wire of the lamp which is located at the outer end of the lamp.

8. The lamp holder of claim 2, further comprising a holder cap inserted to the first recess in a third direction from the lamp guide groove to the inverter insertion groove.

9. The lamp holder of claim 2, wherein the first portion of the power connector includes a power input portion receiving a power source externally provided, and the second portion of the power connector includes a power output portion applying the power source to an electrode portion of the lamp.

10. A power supply module comprising:
    a power supply board having a plurality of power output terminals formed along an edge portion of the power supply board; and
    a plurality of lamp holders, each of the lamp holders comprising:
    a holder body having a lamp guide groove formed on an upper portion of the holder body, and an inverter insertion groove being formed on a lower portion of the holder body, the edge portion of the power supply board being inserted into the inverter insertion groove; and
    a power connector comprising a first portion exposed to the inverter insertion groove and making contact with the power output terminal, and a second portion disposed adjacent to the lamp guide groove.

11. The power supply module of claim 10, further comprising an insulation plate facing the power supply board and having a fixing groove into which the holder body is inserted.

12. The power supply module of claim 11, wherein the first portion comprises:
    a first connection portion making contact with an upper surface of the power supply board; and
    a second connection portion making contact with a lower surface of the power supply board.

13. The power supply module of claim 12, wherein the power output terminal is formed on one of the upper surface and the lower surface of the power supply board to make contact with one of the first connection portion and the second connection portion.

14. A backlight assembly comprising:
   a plurality of lamp holders, each of the lamp holders comprising:
      a holder body having a lamp guide groove being formed on an upper portion of the holder body, and an inverter insertion groove being formed on a lower portion of the holder body; and
      a power connector comprising a first portion exposed to the inverter insertion groove and a second portion disposed adjacent to the lamp guide groove;
   a receiving container comprising a bottom plate having a plurality of openings into which the lamp holders are inserted, and a sidewall disposed on a peripheral portion of the bottom plate;
   a plurality of lamps each comprising a lamp tube guided by the lamp guide groove, and an electrode portion extending from an end portion of the lamp tube and making contact with the second portion; and
   a power supply board slidably inserted into the inverter insertion groove exposed to a rear surface of the bottom plate, power output terminals that make contact with the first portion being formed on the power supply board.

15. The backlight assembly of claim 14, further comprising an insulation plate disposed between the bottom plate and the power supply board, a fixing groove into which the holder body of each of the lamp holders is inserted being formed on the insulation plate.

16. The backlight assembly of claim 15, further comprising:
   a side mold covering the lamp holders, a plurality of grooves being formed on the side mold to prevent interference between the lamps; and
   an optical unit disposed over the lamps and supported by the sidewall and the side mold.

17. The backlight assembly of claim 15, further comprising:
   a lamp reflector disposed adjacent to the sidewall to enclose the lamp and reflect light generated from the lamp toward a receiving space defined by the bottom plate and the sidewall; and
   a light guiding plate comprising a light-exiting face, a counter face facing the light-exiting face, and a side face connecting the light-exiting face and the counter face, the lamp being disposed adjacent to the side face.

18. A display device comprising:
   a plurality of lamp holders, each of the lamp holders comprising:
      a holder body, a lamp guide groove being formed on an upper portion of the holder body and an inverter insertion groove being formed on a lower portion of the holder body; and
      a power connector comprising a first portion exposed to the inverter insertion groove and a second portion disposed adjacent to the lamp guide groove;
   an insulation plate having a fixing groove into which the holder body of each of the lamp holders is slidably inserted;
   a receiving container comprising a bottom plate having a plurality of openings into which the lamp holders fastened to the insulation plate are inserted, and a sidewall disposed on a peripheral portion of the bottom plate;
   a plurality of lamps each comprising a lamp tube guided by the lamp guide groove, and an electrode portion extending from an end portion of the lamp tube and making contact with the second portion;
   a power supply board slidably inserted into the inverter insertion groove exposed to a rear surface of the bottom plate, power output terminals that make contact with the first portion being formed on the power supply board;
   an optical unit disposed over the lamps; and
   a display panel disposed over the optical unit.

* * * * *